United States Patent [19]
Matthews

[11] 3,967,448
[45] *July 6, 1976

[54] GEOTHERMAL ENERGY WELL CASING SEAL

[75] Inventor: Hugh B. Matthews, Acton, Mass.

[73] Assignee: Sperry Rand Corporation, New York, N.Y.

[ * ] Notice: The portion of the term of this patent subsequent to July 23, 1991, has been disclaimed.

[22] Filed: July 29, 1974

[21] Appl. No.: 492,630

[52] U.S. Cl. ................... 60/641; 60/655; 415/501; 285/187; 165/45
[51] Int. Cl.² .................. F03G 7/00; F01K 23/00
[58] Field of Search ............... 415/501; 165/45; 417/390; 166/57, 106, 242; 60/641, 655; 285/187

[56] References Cited
UNITED STATES PATENTS

| | | | |
|---|---|---|---|
| 1,012,777 | 12/1911 | Wigle | 166/61 |
| 1,906,933 | 5/1933 | Standlee | 166/106 |
| 3,142,336 | 7/1964 | Doscher | 166/57 X |
| 3,268,004 | 8/1966 | Kiel | 166/106 |
| 3,282,340 | 11/1966 | Park | 166/106 |
| 3,433,506 | 3/1969 | Crowe | 166/242 X |
| 3,438,312 | 3/1948 | Bunn et al. | 285/187 X |
| 3,721,296 | 3/1973 | Tubbs | 166/106 X |
| 3,824,793 | 7/1974 | Matthews | 60/641 |

Primary Examiner—Charles J. Myhre
Assistant Examiner—Ira S. Lazarus
Attorney, Agent, or Firm—Howard P. Terry

[57] ABSTRACT

A geothermal energy transfer and utilization system makes use of thermal energy stored in hot solute-bearing well water to generate super-heated steam from an injected flow of clean water. The super-heated steam is then used for operating a turbine-driven pump at the well bottom for pumping the hot solute-bearing water at high pressure and in liquid state to the earth's surface, where it is used by transfer of its heat to a closed-loop steam generator-turbine-alternator combination for the beneficial generation of electrical or other power. Residual concentrated solute-bearing water is pumped back into the earth. The clean cooled water regenerated at the surface-located system is returned to the deep well pumping system also for lubrication of a fluid bearing arrangement supporting the turbine-driven pump system. The deep well pump system is supported within the well casing pipe from the earth's surface by the turbine exhaust steam conduit. In view of differential expansion effects on the relative lengths of the casing pipe and the exhaust steam conduit, a novel flexible seal is provided between the suspended turbine-pump system and the well pipe casing.

9 Claims, 2 Drawing Figures

GEOTHERMAL ENERGY WELL CASING SEAL

BACKGROUND OF THE INVENTION

1. Field of the Invention

The invention relates generally to efficient means for the generation of electrical or other power utilizing energy from geothermal sources and, more particularly, relates to arrangements for suspending efficient super-heated steam generation and hot water pumping equipment in deep, hot water wells for the transfer of thermal energy to the earth's surface.

2. Description of the Prior Art

A prior art advance in the art of extraction and use of geothermal energy is reflected in the H. B. Matthews U.S. patent application Ser. No. 300,058 for a "Geothermal Energy System and Method", filed Oct. 24, 1972, issued July 23, 1974 as U.S. Pat. No. 3,824,793, and assigned to the Sperry Rand Corporation. This prior Matthews invention provides means for efficient power generation employing energy derived from geothermal sources through the generation of dry, super-heated steam and the consequent operation of sub-surface equipment for pumping extremely hot well water at high pressures upward to the earth's surface. Clean water is injected at a first or surface station into the deep well where thermal energy stored in hot solute-bearing deep well water is used at a second or deep well station to generate super-heated steam from the clean water. The resultant dry super-heated steam is used at the well bottom for operating a turbine-driven pump pumping the hot solute-bearing well water to the first station at the earth's surface, the water being pumped at all times and locations in the system at pressures which prevent flash steam formation. The highly energetic water is used at the surface or first station in a binary fluid system so that its thermal energy is transferred to a closed-loop surface-located vapor generator-turbine system for driving an electrical power alternator. Cooled, clean water is regenerated by the surface system for re-injection into the well for operation of the steam turbine therein. Undesired solutes are pumped back into the earth via a separate well in the form of a concentrated brine.

SUMMARY OF THE INVENTION

The invention is an improvement facilitating ready installation and reliable operation of geothermal systems of the kind described in the prior Matthews patent; according to the invention, there are provided novel means for the support of the deep well geothermal pump system within the well casing pipe from the earth's surface by the pump-driving turbine exhaust steam conduit. In view of the differential expansion effects on the relative lengths of the casing pipe extending downward from the earth's surface and the exhaust steam conduit contained therein, a novel flexible seal is provided between the suspended geothermal pump system and the well pipe casing. A first element of the improvement provides a vertical smooth cylindrical sealing surface at the desired location for the deep well apparatus by means itself fully sealed to the well casing pipe. A second element assures easy assembly of a second seal interfacing the cylindrical sealing surface and suspended from the hot water pump so as to permit sliding motion of the seal in the hostile prevailing environment, yet affording reliable sealing action.

DESCRIPTION OF THE PREFERRED EMBODIMENTS

Figure 1:
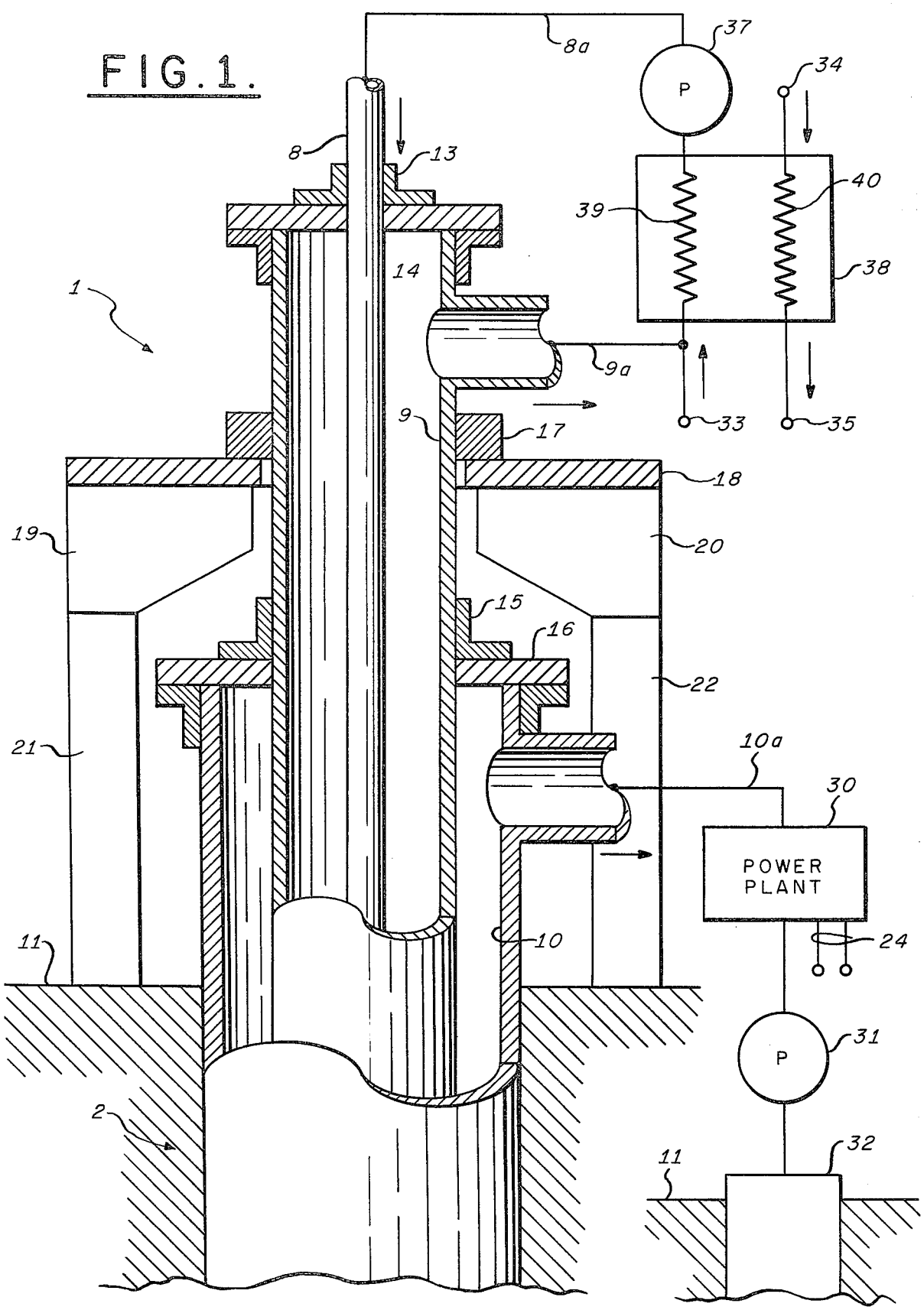
FIG. 1 is an elevation view, mostly in cross section, of the novel suspension arrangement of the deep well geothermal pumping apparatus.
Figure 2:
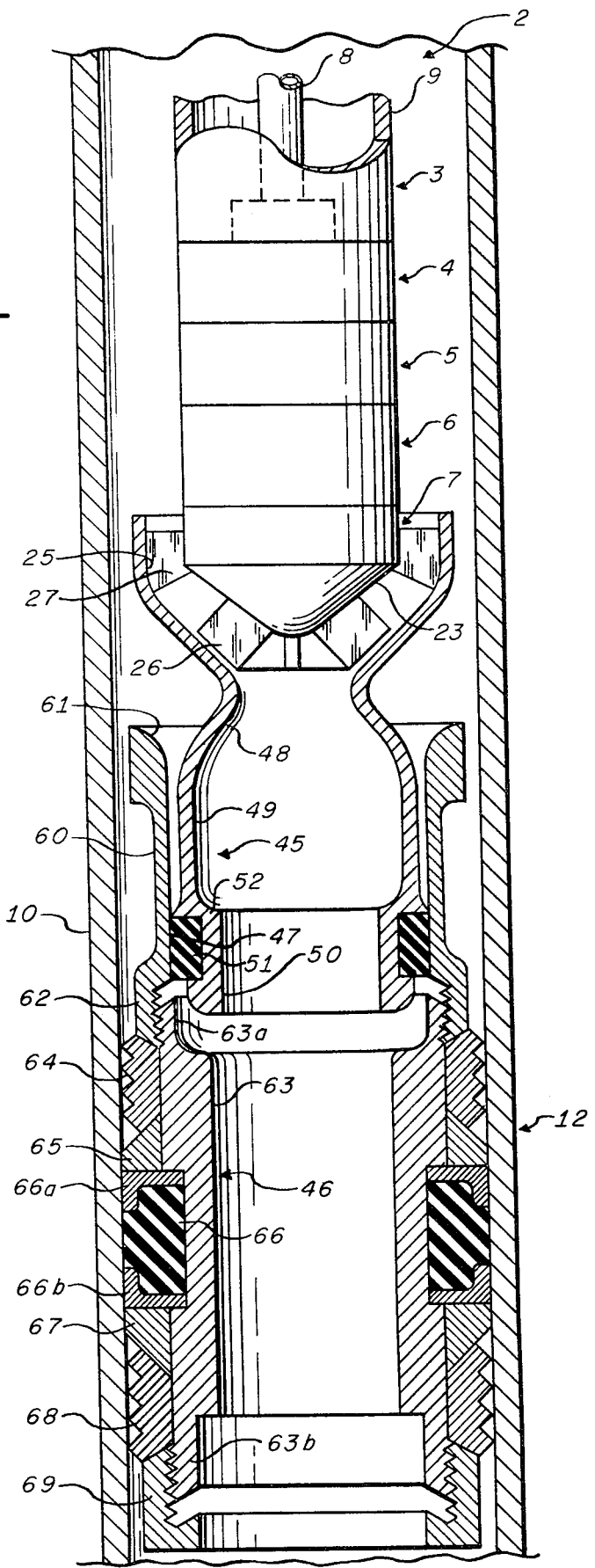
FIG. 2 is an elevation view, mostly in cross section, of the deep well geothermal pump apparatus and of the novel sealing arrangement.

FIGS. 1 and 2 illustrate the general structure and characteristics of that portion of the geothermal energy extraction system which is immersed in a deep well extending into strata far below the surface of the earth, preferably being located at a depth below the surface such that a copious supply of extremely hot water under high pressure is naturally available, the active pumping structure being located adjacent the hot water source and within a generally conventional well casing pipe 10. The configuration in FIG. 1 is seen to include a well head section 1 located above the earth's surface 11 and a main well section 2 extending downward from well head section 1 and below the earth's surface 11. At the subterranean source of hot, high pressure water, as shown in FIG. 2, the main well section 2 joins a steam generator input section 3. The steam generator section 4, the steam turbine section 5, a rotary bearing section 6, and a hot water pumping section 7 follow in close cooperative succession at increasing depths. At the lowest or seal section 12, the input to the pump section 7 is sealed to the inner wall of well casing pipe 10, as will be further described.

Referring again to FIG. 1, the well casing pipe 10 extends downward from the well head section 1 in preferably concentric relation about an innermost stainless steel or other high quality alloy pipe or conduit 8 for supplying a flow of relatively cool and relatively pure water at the bottom of the well. A second relatively large pipe or conduit 9 of similar quality surrounding pipe 8 is also provided within well casing 10, extending from well head 1 to the energy conversion and hot water pumping system at the bottom of the well and permitting turbine exhaust steam to flow to the surface of the earth.

The clean water injection pipe 8 passes through a fitting 13 mounted on the apertured capping plate 14. In similar manner the exhaust steam return pipe 9 passes through a fitting 15 mounted on the apertured capping plate 16. While these generally concentric structures may be integrated to a degree, it is intended that the exhaust steam pipe 9 furnish the main support for the deep well apparatus. For this purpose, a ring collar 17 is welded or otherwise affixed about the exhaust steam pipe 9 immediately below its tee branch 9a. Ring collar 17 normally rests on a suitable horizontal platform 18 which may, in turn, be supported by braces such as braces 19, 20 from associated vertical support beams such as beams 21, 22. The latter are fixed in the earth, for example, by suitable concrete foundation elements (not shown) that may take entirely conventional form. In this manner, the weight of the conduits within the well casing pipe 10 and the weight of the deep well geothermal pump apparatus itself are primarily suspended from the exhaust steam return pipe 9 by platform 18.

It will be seen from FIGS. 1 and 2 that relatively clean and cool water is pumped by pump 37 through pipe 8a into the vertical injection pipe 8 down to the pressure regulator and input section 3 (FIG. 2). As in the aforementioned Matthews patent, the water flow in pipe 8 is then divided for further downward flow in two branching pipes (not shown). A first branch path feeds clean lubricating water for lubricating a system of bearings within the system bearing section 6. The second branch path feeds clean water through a pressure regulator in the steam generator input section 3 and via other distribution pipes to an input manifold of the steam generator in section 4. Accordingly, the high pressure steam is generated and delivered to the steam turbine located within turbine section 5.

The function of the turbine located at section 5 and supported on bearings located within bearing section 6 is to drive a hot water pump located at section 7. Hot, high pressure water is thus impelled upward by the rotating pump blades 26 between the rotating conical end 23 of the pump and an associated stationary shroud 25; the hot water is pumped upward at high velocity in the annular conduit between pipes 9 and 10, thus permitting use of the thermal energy it contains at the earth's surface. More important, the hot water is pumped upward to the earth's surface 11 at a pressure preventing it from flashing into steam and thus undesirably depositing dissolved salts at the point of flashing.

Accordingly, it is seen that the extremely hot, high-pressure well water is pumped upward, flowing in the annular region defined by alloy pipes 9 and 10. Heat supplied by the hot well water readily converts the clean water flowing into the steam generator section 4 into highly energetic, dry, super-heated steam. The clean water, before flowing into the pressure regulator system of input section 3, is at a very high pressure due to its hydrostatic head and also because of the action of the surface-located pressure pump 37 so that it may not flash into steam. The pressure regulator system at location 3 controls the pressure of the clean water flowing therethrough so that it may be vaporized and super-heated in the steam generator in section 4. The highly energetic steam drives the steam turbine at section 4 and is then redirected to flow upward to the surface 11 after expansion as relatively cool steam flowing within the annular conduit defined between alloy pipes 8 and 9. Thermal energy is recovered, as will be discussed, at the earth's surface 11 primarily from the hot, high pressure water flowing upward between pipes 9 and 10, but may also be retrieved at the earth's surface 11 from the turbine exhaust steam, if desired.

As described in the aforementioned Matthews patent, the hot, high pressure water within well casing 10 is fed by pipe 10a to a conventional surface thermal power plant 30 which may include in the usual manner a vapor generator system in which a major part of the energy in the hot geothermal fluid is converted into energy in high pressure vapor for driving an alternator supplying electrical energy on power lines 24, 24. The cooled geothermal fluid is pumped by pump 31 back deep into the earth via re-injection well 32. Thus, the geothermal fluid flow loop is effectively completed and fluid and dissolved mineral salts are returned into deep strata of the earth.

Still referring to FIG. 1, a representative closed loop for supplying and re-injecting clean water into the deep well geothermal system will be described. The steam exhausted upwardly from the driving turbine at section 5 of that well is conveyed by pipes 9 and 9a to a heat exchanger element 39 of a conventional heat exchanger 38 and, after condensation therein, flows through the normally operating pressure pump 37. Heat exchanger 38 may be operated by supplying cooling water in a third loop including a conventional cooling tower (not shown) to pipe 34 connected through heat exchanger element 40 and output pipe 35 back to the same fluid cooling tower. Alternatively, known expedients may be employed for extraction of additional energy during the condensation process for use by power plant 30.

The clean water condensate is pumped by the conventional pump 37 for re-injection into the deep well pipe 8 at a pressure substantially above that of the pumped hot well water. Replenishment water may be supplied from the normally inactive source 33.

As previously noted, the steam turbine driven-hot water pump system is to be suspended at the bottom of the well primarily from the turbine exhaust steam pipe 9. The suspended apparatus includes sections 3 through 7 of the geothermal pump system. After the assembly of sections 3 through 7, the geothermal pump system is lowered into the well casing pipe 10 to its operating level by the gradual lowering of the steam exhaust pipe 9 as the latter is assembled. The clean water injection pipe 8 may be similarly introduced as the assembly is lowered and therefore also lowered into its operating position with the geothermal pump system. Alternatively, the geothermal pump system and steam exhaust pipe 9 may be fed into the well first to its operating location. Then, the clean water injection pipe 8 may be fed into the steam exhaust pipe 9 and, using conventional oil well technology, may then be stabbed into a previously supplied seating nipple (not shown) of standard design furnished at the top of the steam generator input section 3. The weight of the water injection conduit 8 is intended to be borne largely by the top of section 3 and is therefore also supported as a tension load by the steam exhaust pipe 9.

Before the geothermal pump system is put into its operating position, an annular packer element must be provided at that position and an annular seal element must be added to the hot water pump section 7 of the apparatus. While the annular packer 46 of FIG. 2 is permanently affixed during operation of the well to the inner wall of well casing pipe 10, the cooperating pump seal element 45 may translate axially with respect to packer 46 and pipe 10 because of the effects of thermal expansion. The geothermal pump system, hanging as it does from the long steam exhaust pipe 9, may move up or down by inches, so that a slippable seal interface 47 is required between pump section 7 and the well pipe casing 10. The inner wall of casing pipe 10 will normally be rough and will vary substantially in diameter and roundness so that it is not possible for the inner wall to provide a proper sealing surface to slide against in the prevailing pressure and temperature situation.

With reference to the pump seal element 45, it includes a hollow circular expanding section 48 that is simply a smoothly contoured extension of the fixed annular pump shroud 25, the latter being supported from pump section 7 by a plurality of radial vanes 27. The tapered section 48 ends in a hollow circular cylindric section 49 with a thickened end annulus 50. The tubular seal element 45 is thus contoured to encourage smooth flow of the hot well water between the pump shroud 25 and nose cone 23 for accelerated upward flow around pump section 7 in the channel bounded by pipe 10. The annulus 50 includes an annular groove 52 within which is placed a high temperature sealing ring 51 for supplying the required seal interface 47. The seal ring 51 may be composed of a commercially available elastomer designed for operating above 400° Fahrenheit, a combination of an elastomer and asbestos fibers, or the like. Metal parts of the device are made of corrosion resistant alloy.

The packer system 46 of FIG. 2 is a modification of a packer such as is conventionally used in oil well operation. These devices are conventionally defined as devices for packing or filling the space between the wall of a well or well casing and the active well pipe or between two pipe strings in a well when the pipe strings in the well may include adjoining pipes of different sizes. In FIG. 2, the internally threaded ring portion 62 without elements 60 and 61, the main ring 63, the toothed sector 64, the inclined plane ring 65, the seal 66, the inclined plane ring 67, the toothed sector 68, and the internally threaded ring 69 are conventional parts of a commercially obtainable packer. In the usual situation, the packer is lowered into the well by conventional well tools forming no part of the present invention and which are removed from the well after the installation is done.

During installation, the main ring 63 is held stationary by the tool while the internally threaded rings 62 and 69 are rotated in such a sense that they move toward each other on the respective threaded portions 63a, 63b. The toothed sectors at 64 and 68 are driven radially outward as well as toward each other, so that the teeth of the sectors bite into the inner wall of well casing pipe 10 because of the cooperative action of the inclined plane rings 65 and 67, thus fixing the location of packer 46. The latter rings bear against the seal shoes 66a and 66b, compressing the seal element 66 against the inner wall of pipe 10, thus forming an effective seal against fluid flow. While a representative packer has been described, it will be evident that other types of commercially available seals and packers may be employed for the purposes of the invention. Again, the seal ring 66 may be made of various high temperature materials including elastomers, a combination of an elastomer with asbestos, or a combination of asbestos and a polymerized flurocarbon resin, for example. It will be evident that the apparatus may be removed from the well simply by reversing the assembly program.

According to the present invention, the conventional upper internally threaded ring 62 is modified by adding an upwardly extending tubular cylinder portion 60. The internal wall of cylinder 60 is smoothly finished and accurately round so as to provide an ideal mating seal interface 47 with the round ring seal 51. The cylinder 60 is extended upward to a thickened annular portion with an internal taper 61. The taper permits the seal element 45 to mate readily with the cylinder 60 and packer 46 as the geothermal pump system is lowered into its final position. Like other parts of the packer 46, cylinder 60 and its end annulus forming taper 61 are composed of a corrosion resistant alloy such as stainless steel.

Accordingly, it is seen that the invention is a significant improvement over the prior art, facilitating the ready installation and reliable operation of geothermal systems; according to the invention, there are provided novel means for the support of a deep well geothermal pump system within the well casing pipe from the earth's surface by the pump-driving turbine exhaust steam conduit. In view of the differential expansion effects on the relative lengths of the casing pipe extending downward from the earth's surface and the exhaust steam conduit contained therein, a novel flexible seal is provided between the suspended geothermal pump system and the well pipe casing. A first element of the improvement provides a vertical smooth cylindrical sealing surface at the desired location for the deep well apparatus by means itself fully sealed to the well casing pipe. A second element assures easy assembly of a second seal interfacing the cylindrical sealing surface and suspended from the hot water pump so as to permit sliding motion of the seal in the hostile prevailing environment, yet affording reliable and long-life sealing action.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. In geothermal deep well pump apparatus of the kind including deep well pump means having input means for pumping a first fluid always in liquid state through well casing means in cooperative energy exchanging relation with respect to a second fluid for producing a working fluid:
   turbine means at said deep well pump means for driving said deep well pump means in response to said working fluid,
   conduit means for passage of said working fluid residue to the earth's surface from said turbine means,
   said turbine means being suspended within said deep well by said conduit means, and
   resilient seal means disposed in sliding relation between said pump means input means and said well casing means.

2. Apparatus as described in claim 1 further including:
   condenser means at the earth's surface for condensing said working fluid for producing said second fluid,
   tubular injection means in generally concentric relation within said conduit means for supplying said second fluid to said deep well apparatus at a pressure above the pressure of said second fluid.

3. Apparatus as described in claim 2 additionally including:
   electrical power generation means at said station adjacent the earth's surface for converting a major portion of the heat content of said first fluid into electrical power, and
   surface-located pump means for pumping the cooled first fluid output of said electrical power generation means back into deep strata of the earth.

4. Apparatus as described in claim 1 further including elongate hollow tubular packer means affixed in seal-forming manner within said well casing means and having circularly cylindric interior wall means having substantially uniform diameter over a major portion thereof for cooperation with said resilient seal means.

5. Apparatus as described in claim 4 wherein said pump means input means includes downwardly extending tubular means for supporting said resilient seal means in cooperative relation with said circularly cylindric interior wall means.

6. Apparatus as described in claim 5 wherein said circularly cylindric interior wall means has a diameter less than the diameter of the outer wall of said downwardly extending tubular means so as to cooperate in spaced telescoping relation.

7. Apparatus as described in claim 6 wherein:
said circularly cylindric interior wall means has a portion opposite said elongate hollow tubular packer means having outwardly directed annular flared surface means.
said downwardly extending tubular means has a portion opposite said pump means having inwardly directed annular flared surface means, and said outwardly and inwardly directed flared surface forming means thereby aiding the telescoping of said circularly cylindric wall means and said downwardly extending tubular means during installation of said geothermal deep well apparatus.

8. Apparatus as described in claim 7 wherein said resilient seal means comprises annular elastic ring means supported in a groove adjacent said inwardly directed annular flared surface means.

9. Apparatus as described in claim 8 wherein said annular elastic ring is composed at least in part of a high temperature elastomer.

* * * * *